(12) United States Patent
Moniz et al.

(10) Patent No.: US 7,661,260 B2
(45) Date of Patent: Feb. 16, 2010

(54) GAS TURBINE ENGINE ASSEMBLY AND METHOD OF ASSEMBLING SAME

(75) Inventors: Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 598 days.

(21) Appl. No.: 11/535,592

(22) Filed: Sep. 27, 2006

(65) Prior Publication Data

US 2008/0072567 A1    Mar. 27, 2008

(51) Int. Cl.
*F02K 3/02* (2006.01)

(52) U.S. Cl. .................................. 60/226.1; 60/39.162

(58) Field of Classification Search .................. 60/268, 60/226.1, 39.162, 262; 415/9, 174.4; 416/2
See application file for complete search history.

(56) References Cited

U.S. PATENT DOCUMENTS

| 3,449,926 | A |   | 6/1969  | Hawkins |
|-----------|---|---|---------|---------|
| 3,602,535 | A |   | 8/1971  | Behning et al. |
| 3,652,178 | A |   | 3/1972  | Guillot |
| 3,729,957 | A | * | 5/1973  | Petrie et al. ................. 60/226.1 |
| 3,900,270 | A |   | 8/1975  | Rhodes |
| 3,970,398 | A |   | 7/1976  | Wilson |
| 4,005,575 | A | * | 2/1977  | Scott et al. .................. 60/226.1 |
| 4,037,404 | A | * | 7/1977  | Bougain ....................... 60/223 |
| 4,751,816 | A | * | 6/1988  | Perry .......................... 60/226.1 |
| 4,790,133 | A | * | 12/1988 | Stuart ........................ 60/226.1 |
| 4,804,288 | A | * | 2/1989  | Tiernan, Jr. .................. 403/24 |
| 4,827,712 | A | * | 5/1989  | Coplin ....................... 60/226.1 |
| 4,916,894 | A | * | 4/1990  | Adamson et al. ........... 60/226.1 |
| 4,969,325 | A | * | 11/1990 | Adamson et al. ........... 60/226.1 |
| 5,127,799 | A |   | 7/1992  | Berry |
| 5,131,782 | A |   | 7/1992  | Bruno et al. |
| 5,220,784 | A | * | 6/1993  | Wilcox ......................... 60/796 |
| 5,274,999 | A | * | 1/1994  | Rohra et al. ................ 60/226.1 |
| 5,282,358 | A | * | 2/1994  | Schilling ................... 60/226.1 |
| 5,288,210 | A |   | 2/1994  | Albrecht et al. |
| 5,580,183 | A | * | 12/1996 | Brackoneski et al. ..... 403/359.1 |
| 6,158,210 | A | * | 12/2000 | Orlando ..................... 60/226.1 |
| 6,352,385 | B1|   | 3/2002  | Wojciechowski et al. |
| 6,763,654 | B2| * | 7/2004  | Orlando et al. ............ 60/226.1 |
| 7,490,460 | B2| * | 2/2009  | Moniz et al. ................... 60/268 |
| 7,490,461 | B2| * | 2/2009  | Moniz et al. ................... 60/268 |
| 7,493,753 | B2| * | 2/2009  | Moniz et al. ................... 60/268 |
| 7,493,754 | B2| * | 2/2009  | Moniz et al. ................... 60/268 |

(Continued)

*Primary Examiner*—William H Rodriguez
(74) *Attorney, Agent, or Firm*—William Scott Andes, Esq.; Armstrong Teasdale LLP

(57) ABSTRACT

A method for assembling a gas turbine engine assembly includes coupling a fan assembly to a core gas turbine engine such that the fan assembly is upstream from the core gas turbine engine, coupling a low-pressure turbine downstream from the core gas turbine engine such, wherein the low-pressure turbine includes a disk and a plurality of splines formed in the disk, providing a shaft that includes a first end and a second end that includes a plurality of splines, coupling the shaft first end to the fan assembly, and coupling the shaft second end to the low-pressure turbine such that the shaft splines mesh with the disk splines such that torque is transmitted from the low-pressure turbine to the fan assembly via the shaft during engine operation.

18 Claims, 4 Drawing Sheets

U.S. PATENT DOCUMENTS 7,513,103 B2 * 4/2009 Orlando et al. ............... 60/268
7,526,913 B2 * 5/2009 Orlando et al. ............... 60/268
2008/0124168 A1 * 5/2008 Lescure et al. ........... 403/359.1

* cited by examiner

GAS TURBINE ENGINE ASSEMBLY AND METHOD OF ASSEMBLING SAME

BACKGROUND OF THE INVENTION

This invention relates generally to gas turbine engines, and more specifically to gas turbine engine assemblies and methods of assembling the same.

At least some known gas turbine engines include a fan, a core gas turbine engine, and a power or low-pressure turbine. The core engine includes a high-pressure compressor, a combustor, and a high-pressure turbine that are coupled together in a serial flow relationship. The low-pressure turbine is coupled downstream from, and driven by, the core gas turbine engine. More specifically, the high-pressure compressor and the high-pressure turbine are coupled together using a first shaft to define a high-pressure rotor assembly, and the low-pressure turbine and the fan are coupled together using a second shaft. Air entering the core engine is mixed with fuel and ignited to form a high energy gas stream. The high energy gas stream is discharged through the high-pressure turbine to drive the high-pressure turbine and thus also drive the low-pressure turbine.

To reduce life-cycle maintenance costs, gas turbine engines under design consideration include a high-pressure turbine disk that has a bore diameter that is substantially smaller than the bore diameter of known high-pressure turbine disks. Utilizing a high-pressure turbine disk having a relatively small bore diameter may result in an increase of the disk life by reducing disk stress. Specifically, the core gas turbine engine is sized to accommodate the high-pressure turbine disk. While sizing the high-pressure turbine disk may increase the life of the disk, the core gas turbine engine must still be designed to have an acceptable speed margin between operating speed and the first critical.

However, while design considerations provide for a core gas turbine engine that is capable of operating at a much higher speed than at least some known core engines, it is difficult to design a gas turbine engine that meets both the high-pressure turbine disk life requirements, and also meets the speed margin criteria. Specifically, the smaller diameter high-pressure turbine disk bore results in a reduced diameter drive shaft between the low-pressure turbine and the fan. As a result, this drive shaft may experience bending or torque levels that are also not acceptable to meet design criteria.

BRIEF DESCRIPTION OF THE INVENTION

In one aspect, a method of assembling a gas turbine engine assembly is provided. The method includes coupling a fan assembly to a core gas turbine engine such that the fan assembly is upstream from the core gas turbine engine, coupling a low-pressure turbine downstream from the core gas turbine engine such, wherein the low-pressure turbine includes a disk having a flange and a plurality of splines formed in the flange, providing a shaft that includes a first end and a second end that includes a plurality of splines, coupling the shaft first end to the fan assembly, coupling the shaft second end to the low-pressure turbine disk such that the shaft splines mesh with the flange splines such that torque is transmitted from the low-pressure turbine to the fan assembly via the shaft during engine operation.

In another aspect, a gas turbine engine assembly is provided. The gas turbine engine assembly includes a core gas turbine engine, a fan assembly coupled to the core gas turbine engine such that the fan assembly is upstream from the core gas turbine engine, a low-pressure turbine coupled to the core gas turbine engine, the low-pressure turbine coupled downstream from the core gas turbine engine, the low-pressure turbine comprising a disk comprising a flange and a plurality of splines formed in the disk, and a shaft including a first end coupled to the fan assembly and a second end that comprises a plurality of splines, the shaft splines configured to mesh with the flange splines such that torque is transmitted from the low-pressure turbine to the fan assembly via the shaft.

DETAILED DESCRIPTION OF THE INVENTION

Figure 1:
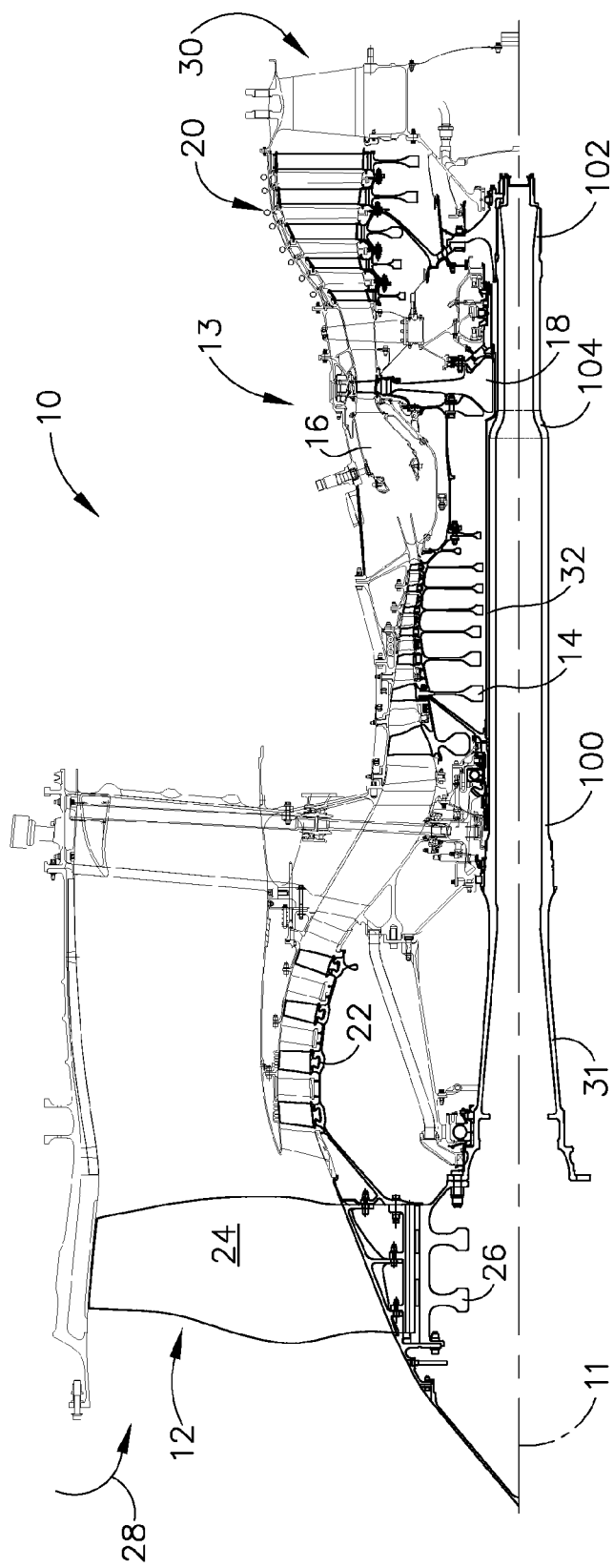
FIG. 1 is a schematic illustration of an exemplary gas turbine engine assembly.

FIG. 1 is a schematic illustration of an exemplary gas turbine engine assembly 10 having a longitudinal axis 11. Gas turbine engine assembly 10 includes a fan assembly 12 and a core gas turbine engine 13. Core gas turbine engine 13 includes a high pressure compressor 14, a combustor 16, and a high pressure turbine 18. Gas turbine engine assembly 10 also includes a low pressure turbine 20 and a multi-stage booster compressor 22.

Fan assembly 12 includes an array of fan blades 24 extending radially outward from a rotor disk 26. Gas turbine engine assembly 10 has an intake side 28 and an exhaust side 30. Fan assembly 12, booster 22, and low-pressure turbine 20 are coupled together by a first rotor shaft 31, and compressor 14 and turbine 18 are coupled together by a second rotor shaft 32.

In operation, air flows through fan assembly 12 and a first portion of the airflow is channeled through booster 22. The compressed air that is discharged from booster 22 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 22 by way of shaft 31. Gas turbine engine assembly 10 is operable at a range of operating conditions between design operating conditions and off-design operating conditions.

Figure 2:
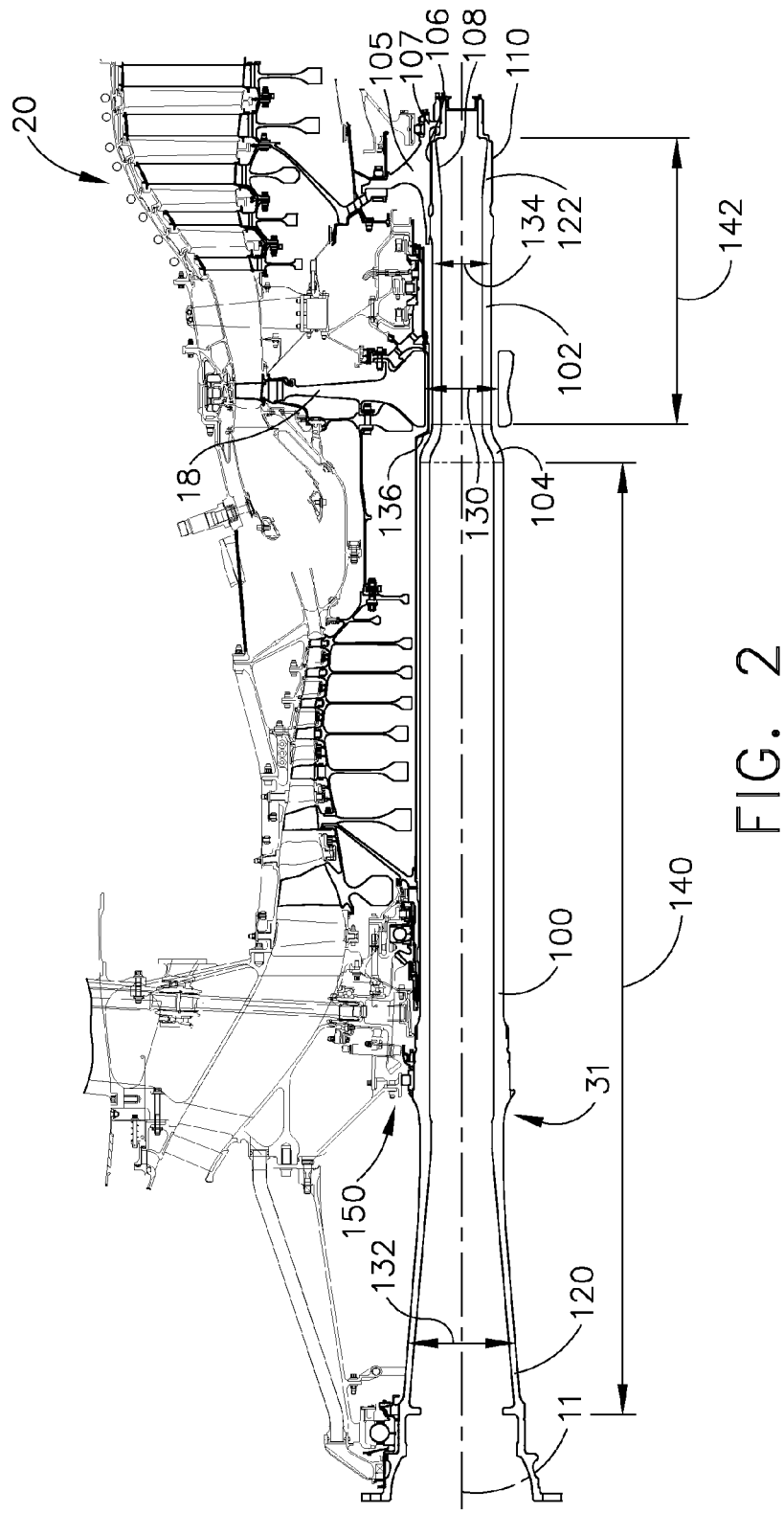
FIG. 2 is an enlarged cross-sectional view of the low-pressure turbine shaft shown in FIG. 1.

FIG. 2 is a cross-sectional view of a shaft 31 shown in FIG. 1. In the exemplary embodiment, shaft 31 includes a first portion 100, a second portion 102 and a transition portion 104 that is coupled between first and second portions 100 and 102. Moreover, low-pressure turbine 20 includes a rotor disk 105, a flange 106 that is formed integrally with rotor disk 105, a bore 106 that extends through rotor disk 105, and a plurality of splines 108 that are formed around the radially inner surface of bore 107. In the exemplary embodiment, bore 106 is formed through a centerline of flange 107 around longitudinal axis 11. As such, shaft 31 includes a plurality of splines 110 that are configured to mesh with a flange splines 108 such that torque is transmitted from low-pressure turbine 20 to fan assembly 12 via shaft 31 during engine operation.

Shaft 31 also includes a first end 120 that is coupled to fan assembly 12 and a second end 122 that includes shaft splines 110 that is coupled to low-pressure turbine 20. In the exemplary embodiment, flange splines 108 are female splines and shaft splines 110 are male splines configured to mesh with the female splines. Optionally, shaft splines 110 are female splines and flange splines 108 are male splines. As used herein, splines are denote a series of ridges that are formed on a shaft or through a disk that mesh with and equalize the rotational speed of the pieces splined together, thereby transferring torque.

In the exemplary embodiment, shaft 31 is configured to accommodate an oversized high-pressure turbine 18. More specifically, since high-pressure turbine disk 105 has an inner diameter 130 that is substantially smaller than known high-pressure turbine disks, shaft 31 is selectively sized to accommodate the substantially larger high-pressure turbine disk that has a substantially smaller flange bore that known gas turbine engines. As such, shaft first end 120 has an outer diameter 132 that is greater than the inner diameter 130 of high-pressure turbine 18, and shaft second end 122 has an outer diameter 134 that is less than outer diameter 132. This configuration enables shaft second end 122 to be installed through the high-pressure turbine flange bore 136 formed through high-pressure turbine disk 105 and coupled to low-pressure turbine 20.

To maintain the structural strength of shaft 31, and thus reduce shaft flexing, first portion diameter 132 is substantially greater than second portion diameter 134. For example, in one embodiment, first portion 100 has a diameter 132 that is approximately 4.5 inches, and second portion 102 has a diameter 134 that is approximately 3.5 inches. However, it should be realized that second diameter 134 is selected based on the inner diameter 130 of high-pressure turbine disk 105, and as such, may be either increased or decreased to ensure that shaft 31 is capable of being inserted through high-pressure turbine disk flange bore 136 and coupled to low-pressure turbine 20.

Moreover, first portion 100 has a length 140 that is greater than a length 142 of second portion 102. Thus, the thickness or diameter 132 of first shaft portion 100 along length 140 is substantially larger than diameter 134 of second shaft portion 102 along length 142. More specifically, since fan assembly 12 and high-pressure turbine 18 are separated by a distance, the length 140 of first portion 100 is selected such that the diameter 132 of first portion 100 can be maximized between the fan assembly 12 and the high-pressure turbine 18, wherein the diameter of shaft 31 is reduced to allow shaft 31 to extend through disk flange bore 136 and be coupled to low-pressure turbine 20. As such, the length 140 of first portion 100 is substantially greater than the length 142 of second portion 102.

As discussed above, shaft 31 includes first, second, and third portions 100, 102, and 104, respectively. In one embodiment, first, second, and third portions 100, 102, and 104, are fabricated as separate components that are coupled together using a welding or brazing procedure, for example. In the exemplary embodiment, first, second, and third portions are formed as single unitary shaft 31.

Figure 3:
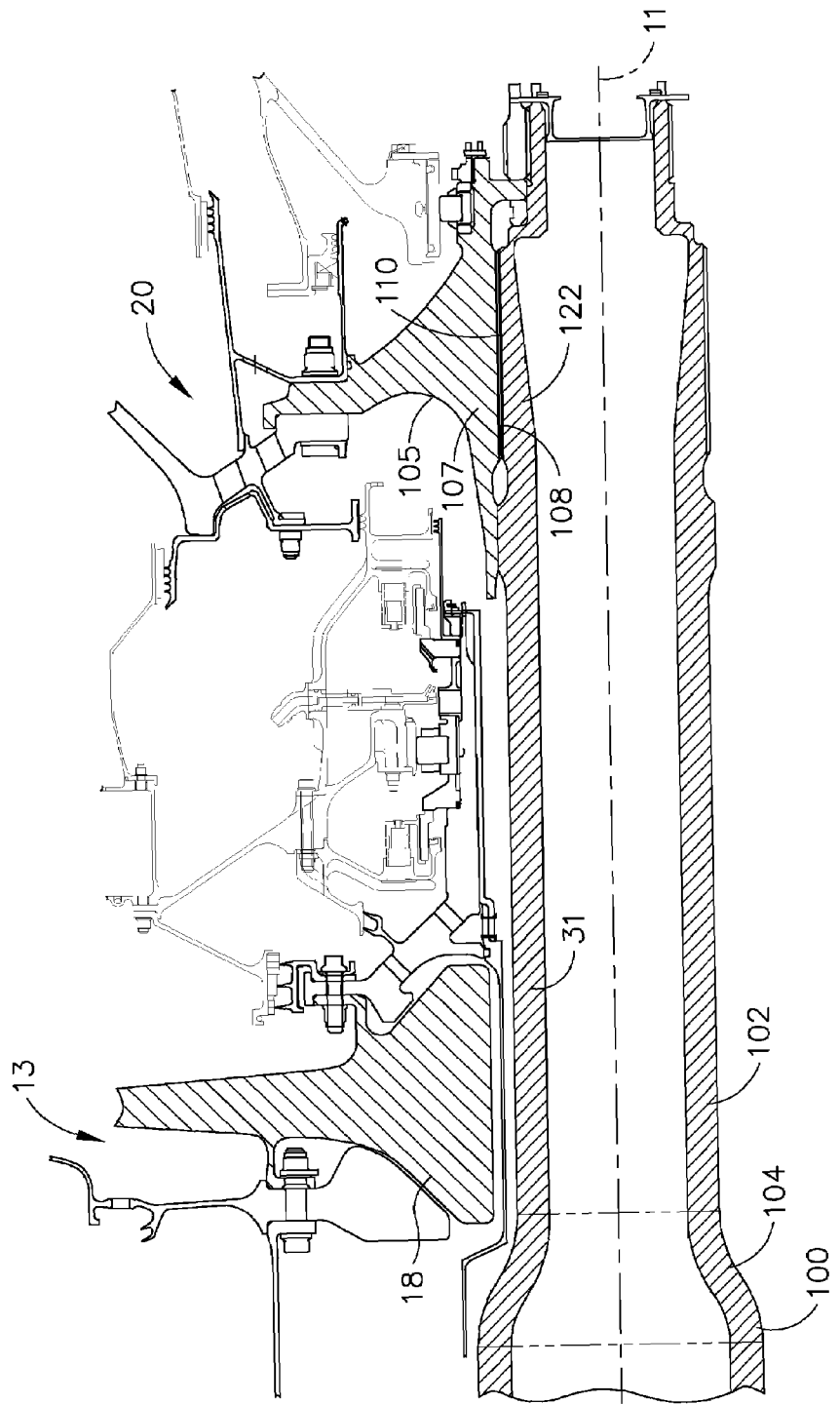
FIG. 3 is an enlarged cross-sectional view of a downstream portion of the gas turbine engine assembly shown in FIG. 1.
Figure 4:
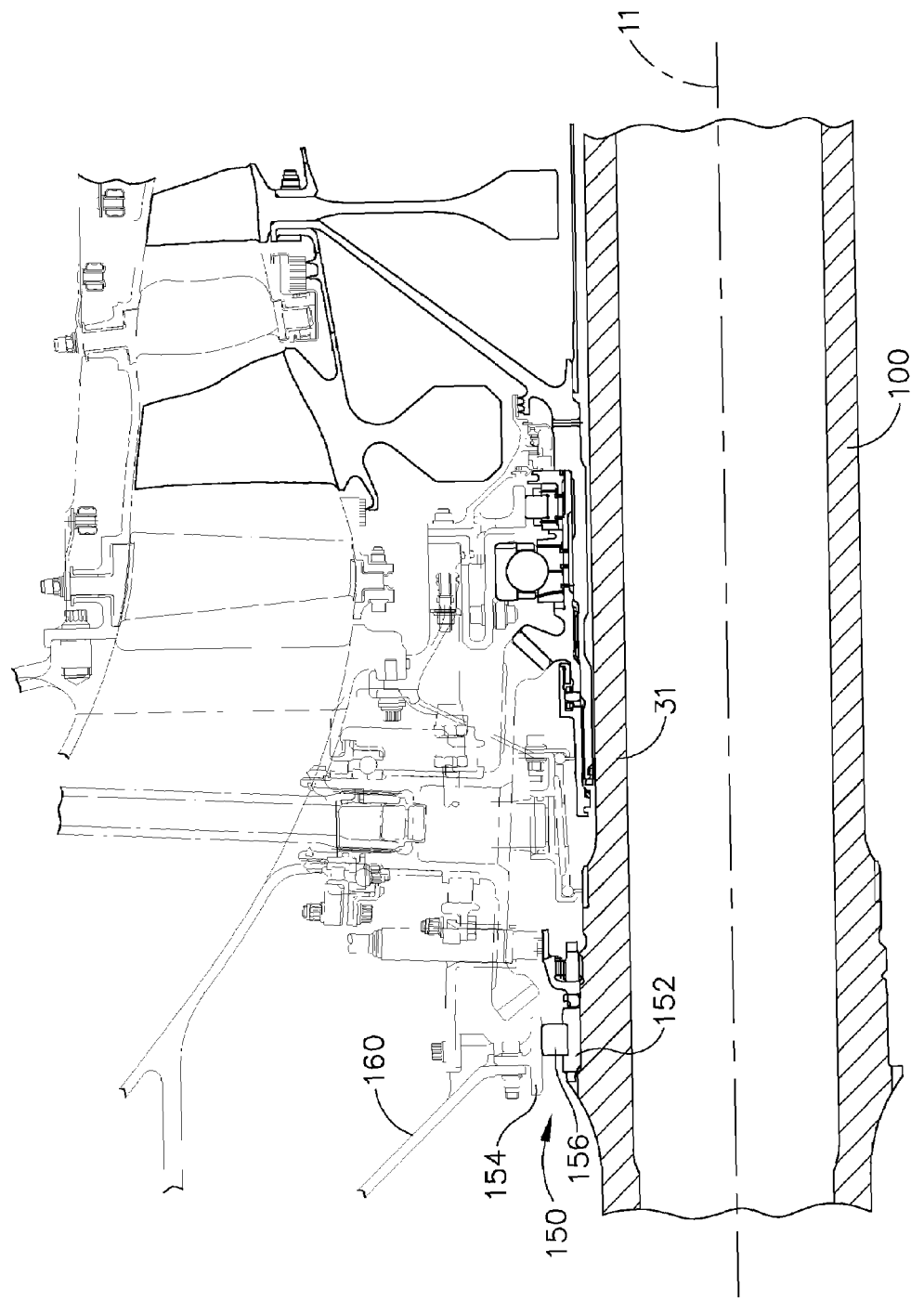
FIG. 4 is an enlarged cross-sectional view of a forward portion of the gas turbine engine assembly shown in FIG. 1.

FIG. 3 is an enlarged cross-sectional view of a downstream portion of the gas turbine engine assembly shown in FIG. 1. FIG. 4 is an enlarged cross-sectional view of a forward portion of the gas turbine engine assembly shown in FIG. 1. As shown in FIG. 3, during assembly, the low-pressure turbine 20 is coupled to a downstream end of core gas turbine engine 13. Shaft 31 is then inserted through core gas turbine engine 13, including high-pressure turbine 18 such that shaft second end 122 is inserted at least partially into low-pressure turbine 20 and such that flange splines 108 mesh with shaft splines 110.

As shown in FIG. 4, shaft 31 is supported at a forward end of core gas turbine engine 13 utilizing a bearing assembly 150. Bearing assembly 150 includes a rotating inner race 152 that is secured to shaft 31, a stationary outer race 154 that is coupled to a frame 160, and a plurality of rolling elements 156 that are positioned between inner and outer races 152 and 154, respectively. In the exemplary embodiment, bearing assembly 150 is a roller bearing assembly that provides rotational support for shaft 31 and facilitates reducing shaft flexing. Fan assembly 12 is then coupled to an upstream end of core gas turbine engine 13, and shaft first end 120 is coupled to fan assembly 12 such that low-pressure turbine 20 is then coupled to fan assembly 12.

Described herein is a gas turbine engine assembly that includes a fan assembly, a core gas turbine engine, a low-pressure turbine, and a shaft coupled between the fan assembly and the low-pressure turbine. Specifically, the gas turbine engine described herein includes a low-pressure turbine shaft that enables a high-pressure turbine having a decreased bore diameter to be utilized. As a result, the life span of the high-pressure turbine is increased by reducing stress, while still maintaining an acceptable speed margin between operating speed and the first critical.

Specifically, the diameter of the high-pressure turbine is increased by utilizing a low-pressure turbine shaft that is splined to the low-pressure turbine flange at the aft end, whereas known gas turbines includes splines at the forward end of the low-pressure turbine shaft. As a result, a reduced shaft diameter occurs at the end of the shaft which allows the high-pressure turbine to be designed with a smaller bore radius and therefore increased life. Moreover, the turbine vane frame allows the high-pressure turbine to be straddle mounted between bearing assemblies and decouples the low-pressure turbine shaft from the high-pressure turbine shaft for improved dynamic speed margin. This configuration reduces the complexity of engine assembly and disassembly. For example, since the low-pressure turbine shaft is splined at the aft end, the shaft may be installed and removed from the front of the gas turbine engine, thus improving assembly and disassembly of the gas turbine engine. The reduced complexity of assembly and disassembly may allow for the elimination of the lower low-pressure turbine torque cone flange thus reducing cost and weight, which are replaced by circumferential bosses which provide a bolting surface for the seals. Weight savings will also occur by incorporating smaller bolts used to hold the seals since the flange required for transmitting full low-pressure shaft torque has been eliminated.

While the invention has been described in terms of various specific embodiments, those skilled in the art will recognize that the invention can be practiced with modification within the spirit and scope of the claims.

What is claimed is:

1. A method for assembling a gas turbine engine assembly, said method comprising:

coupling a fan assembly to a core gas turbine engine such that the fan assembly is upstream from the core gas turbine engine;

coupling a low-pressure turbine downstream from the core gas turbine engine, wherein the low-pressure turbine includes a disk, a flange formed with said disk, and a plurality of splines formed in the flange;

providing a shaft that includes a first end having a first outer diameter and a second end having a second outer diameter that is less than the first outer diameter, said second end further including a plurality of splines;

coupling the shaft first end to the fan assembly; and coupling the shaft second end to the low-pressure turbine disk flange such that the shaft splines mesh with the flange splines such that torque is transmitted from the low-pressure turbine to the fan assembly via the shaft during engine operation.

2. A method in accordance with claim 1, wherein the shaft includes a plurality of male splines and the flange includes a plurality of female splines, said method further comprising coupling the shaft second end to the low-pressure turbine such that a plurality of the shaft male splines mesh with the flange female splines.

3. A method in accordance with claim 1, wherein providing a shaft further comprises providing a shaft that includes a first portion having an outer diameter and a second portion having an outer diameter that is less than the first portion outer diameter.

4. A method in accordance with claim 1, wherein providing a shaft further comprises providing a shaft that includes a first portion having a first length and a second portion having a second length that is less than the first length.

5. A method in accordance with claim 4, wherein providing a shaft further comprises providing a shaft that includes a first portion and a second portion that is formed unitarily with the first portion.

6. A method in accordance with claim 4, wherein providing a shaft further comprises providing a shaft includes a first portion having a length that is approximately equal to an axial distance between the fan assembly and a high-pressure turbine.

7. A method in accordance with claim 4, wherein the core gas turbine engine includes a high-pressure turbine including a disk having a bore extending therethrough, said method further comprising providing a shaft that includes a first portion having an outer diameter that is greater than an inner diameter of the disk bore.

8. A method in accordance with claim 1, wherein the core gas turbine engine includes a high-pressure turbine, said method further comprising coupling the high-pressure turbine downstream from the shaft first portion.

9. A method in accordance with claim 1, wherein providing a shaft further comprises providing a shaft that includes a first portion having an outer diameter that is between approximately four and five inches, and a second portion having an outer diameter that is between approximately three and four inches.

10. A gas turbine engine assembly comprising:
a core gas turbine engine;
a fan assembly coupled to said core gas turbine engine such that said fan assembly is upstream from said core gas turbine engine;
a low-pressure turbine coupled to said core gas turbine engine, said low-pressure turbine disposed downstream from said core gas turbine engine, said low-pressure turbine comprising a disk comprising a flange and a plurality of splines formed in said flange; and
a shaft comprising a first end coupled to said fan assembly and a second end that comprises a plurality of splines, said shaft splines configured to mesh with said flange splines such that torque is transmitted from said low-pressure turbine to said fan assembly via said shaft, said shaft first end having a first outer diameter and said shaft second end having a second outer diameter that is less than the first outer diameter.

11. A gas turbine engine assembly in accordance with claim 10, wherein said shaft splines comprise a plurality of male splines and said flange splines comprise a plurality of female splines configured to mesh with said male splines.

12. A gas turbine engine assembly in accordance with claim 10, wherein said shaft comprises:
a first portion having an outer diameter; and
a second portion having an outer diameter that is less than said first portion outer diameter.

13. A gas turbine engine assembly in accordance with claim 12, wherein said first portion has a first length and said second portion has a second length that is less than said first length.

14. A gas turbine engine assembly in accordance with claim 12, wherein said fan assembly and said high-pressure turbine are separated by a distance that is approximately equal to said first length.

15. A gas turbine engine assembly in accordance with claim 12, wherein said first portion and said portion are formed unitarily.

16. A gas turbine engine assembly in accordance with claim 12, wherein said core gas turbine engine comprises a high-pressure turbine comprising a disk having a bore extending therethrough, said bore having an inner diameter that is smaller than said shaft first portion outer diameter.

17. A gas turbine engine assembly in accordance with claim 12, wherein said core gas turbine engine comprises a high-pressure turbine that is coupled downstream said shaft first portion.

18. A gas turbine engine assembly in accordance with claim 10, wherein said shaft comprises:
a first portion having an outer diameter that is between approximately four and five inches; and
a second portion having an outer diameter that is between approximately three and four inches.

* * * * *